(12) United States Patent
Kawabe et al.

(10) Patent No.: US 8,280,221 B2
(45) Date of Patent: Oct. 2, 2012

(54) TRANSMISSION SERVER SYSTEM AND MATERIAL TRANSFER METHOD

(75) Inventors: Tsuyoshi Kawabe, Tokyo (JP);
Yoshinori Ishida, Kanagawa (JP);
Akiyuki Takano, Tokyo (JP); Naoko Seki, Kanagawa (JP); Yuki Hikita, Kanagawa (JP); Yoshie Tadano, Kanagawa (JP); Rikako Yanagisawa, Tokyo (JP)

(73) Assignee: Sony Corporation, Tokyo (JP)

( * ) Notice: Subject to any disclaimer, the term of this patent is extended or adjusted under 35 U.S.C. 154(b) by 307 days.

(21) Appl. No.: 12/721,623

(22) Filed: Mar. 11, 2010

(65) Prior Publication Data

US 2010/0239229 A1 Sep. 23, 2010

(30) Foreign Application Priority Data

Mar. 18, 2009 (JP) ................ P2009-065375

(51) Int. Cl.
*H04N 5/765* (2006.01)
*H04N 5/92* (2006.01)
*H04N 7/16* (2011.01)

(52) U.S. Cl. ......... 386/200; 386/326; 725/143; 725/144

(58) Field of Classification Search .......... 386/200, 386/326; 725/143, 144
See application file for complete search history.

(56) References Cited

U.S. PATENT DOCUMENTS 5,724,646 A * 3/1998 Ganek et al. .............. 725/89

FOREIGN PATENT DOCUMENTS

JP 2008 59096 3/2008

* cited by examiner

*Primary Examiner* — Thai Tran
*Assistant Examiner* — Hung Dang
(74) *Attorney, Agent, or Firm* — Frommer Lawrence & Haug LLP; William S. Frommer; Ellen Marcie Emas

(57) ABSTRACT

A transmission server system includes: a material output portion that temporarily stores materials making up a program and transferred from a material server and outputs the materials by successively reading out the materials, wherein the material output portion has a plurality of recording and reproducing portions, the materials making up the program are transferred from the material server commonly to the plurality of recording and reproducing portions and recorded in each, and the respective materials are reproduced by and outputted from a recoding and reproducing portion as a transmission subject among the plurality of recording and reproducing portions.

4 Claims, 7 Drawing Sheets

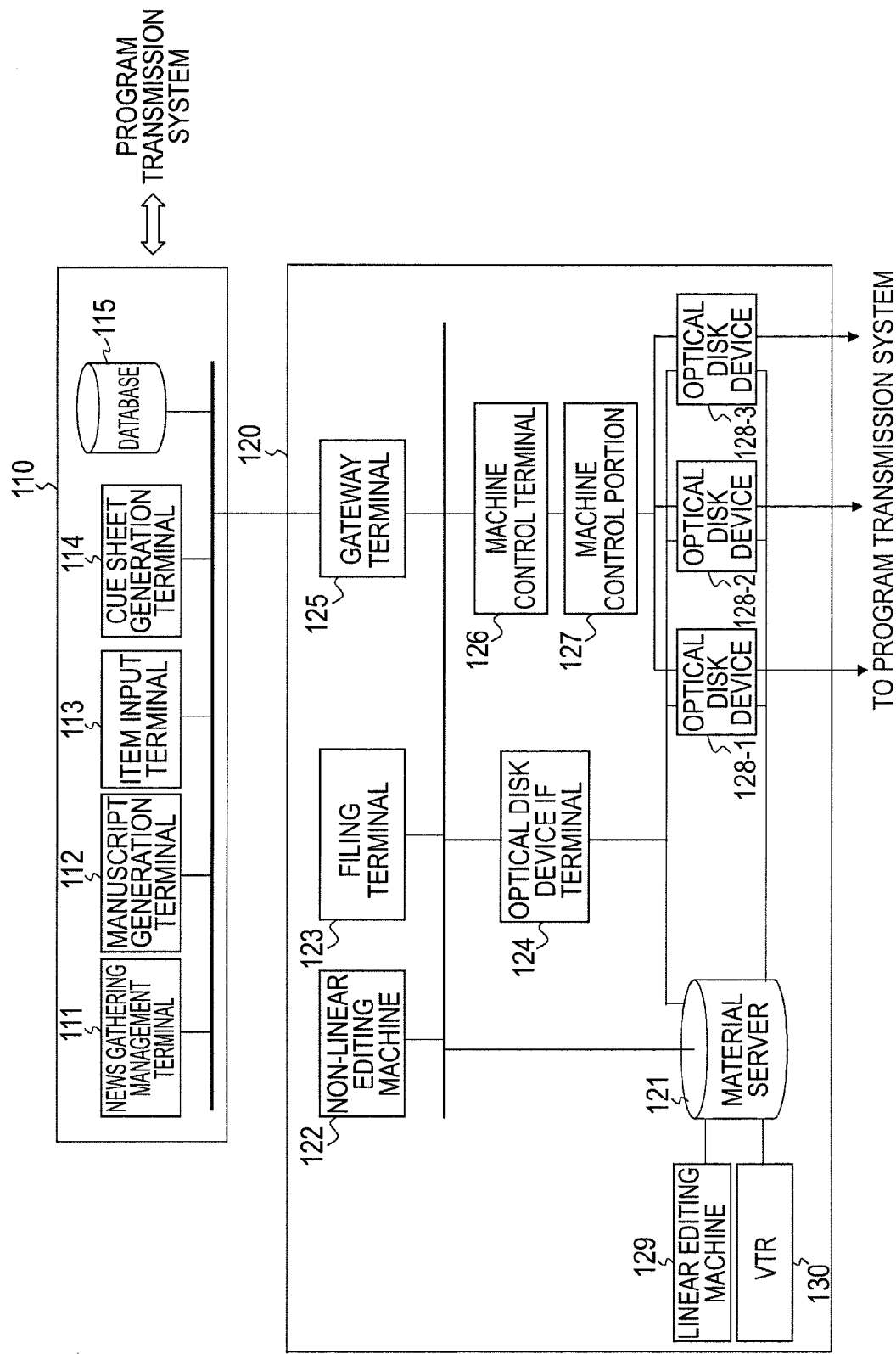

FIG.2

FINDS  PROGRAM TABLE - DEC. 12, 2007
FILE (F) CONTROL (C) HELP (H)

| | START OA | END OA | | INPUT | RELEASE LOCK | REHEARSAL | | ON-AIR PROGRAM | | UNDO | | CUE SHEET |

| < | DEC. 12, 2007 | > | CURRENT DAY | 14:00:00 | | □ V9 | □ V8 | □ V6 | □ V10 | □ UTL |

| NO. | PROGRAM TITLE | VERSION | START TIME | END TIME | FRAME | PO NAME | STUDIO No. |
|---|---|---|---|---|---|---|---|
| 1<br>0001 | MORNING WIDE | 1ST | 05:25:00 | 08:00:00 | 02:35:00 | TANAKA | V9 |
| 2<br>0002 | KANTOU-KOUSHINETSU NEWS | 2ND | 11:30:00 | 12:00:00 | 00:30:00 | YAMADA | V9 |
| 3<br>0003 | FROM TOKYO TOWER | 3RD | 14:05:00 | 14:07:00 | 00:02:00 | SATOH | V9 |
| 4<br>0004 | EVENING NEWS | 4TH | 16:53:00 | 19:00:00 | 02:07:00 | SUZUKI | V9 |
| 5<br>0005 | WEATHER FORECAST | 0TH | 20:54:00 | 21:00:00 | 00:06:00 | SASAKI/<br>NAKAMURA | V9 |
| 6<br>0006 | MIDNIGHT NEWS | 10TH | 23:30:00 | 23:55:00 | 00:25:00 | SASAKI | V9 |

NOW ◁ ◀ ▶ ▷

FIG. 3

TRANSMISSION SERVER SYSTEM AND MATERIAL TRANSFER METHOD

BACKGROUND OF THE INVENTION

1. Field of the Invention

The present invention relates to a transmission server system suitably used, for example, for a news program production system and to a material transfer method.

2. Description of the Related Art

It is necessary for a news program on television broadcastings to transmit a wide variety of news sources gathered at respective sub-stations, branch offices, and press clubs of broadcast stations to viewers quickly and precisely. In practice, when a news program is broadcasted on the air, a news gathering schedule is set by the news department and then news sources gathered at respective sub-stations, branch offices, or press clubs are edited quickly by a program production transmission system.

The news sources edited by the program production transmission system are broadcasted on the air according to a cue sheet (program progress chart) specifying the content of the program and broadcast times of respective items making up the program. A program production transmission system of this type is described, for example, in JP-A-2008-59096.

SUMMARY OF THE INVENTION

The program production transmission system described above includes a transmission server formed of an HDD as a material output portion. Materials making up a program are transferred from the material server to the transmission server and temporarily recorded therein. The recorded materials are then read out successively according to cue sheet information.

A single transmission server includes a plurality of transmission ports. As has been described above, the transmission server is formed of an HDD and is capable of outputting materials recorded in the HDD from an arbitrary transmission port.

The transmission server, however, is expensive, which poses a problem that the material output portion becomes correspondingly expensive. In addition, because the transmission server is configured to include an HDD, there is another problem that a countermeasure against a crash of the HDD, such as mirroring, is necessary.

It is desirable to form a material output portion at a low cost and to make a countermeasure, such as mirroring, unnecessary.

According to an embodiment of the present invention, there is provided a transmission server system including a material output portion that temporarily stores materials making up a program and transferred from a material server and outputs the materials by successively reading out the materials. The material output portion has a plurality of recording and reproducing portions. The materials making up the program are transferred from the material server commonly to the plurality of recording and reproducing portions and recorded in each. The respective materials are reproduced by and outputted from a recoding and reproducing portion as a transmission subject among the plurality of recording and reproducing portions.

According to the configuration above, the material output portion is formed of a plurality of recording and reproducing portions, for example, a plurality of optical disk devices. When materials making up a program are transferred from the material server to the material output portion and recorded therein, the materials are transferred commonly to a plurality of the recording and reproducing portions and recorded in each.

When the material output portion is formed of a plurality of the recording and reproducing portions in this manner, the material output portion can be formed at a lower cost than in a case where the material output portion is formed of a transmission server as in the related art. Also, because materials are transferred commonly to a plurality of the recording and reproducing portions and recorded in each, even in a case where one recording and reproducing portion is broken, the same materials are recorded in the other recording and reproducing portions as backup. Accordingly, a countermeasure, such as mirroring, becomes unnecessary. In addition, in a case where one recording and reproducing portion is broken, the system can be restored readily at a low cost by replacing the broken recording and reproducing portion alone.

It may be configured in such a manner that: of the plurality of recording and reproducing portions that the material output portion has, for example, at least one recording and reproducing portion is used as a recording and reproducing portion for emergency use; the materials making up the program and transferred from the material server are transferred commonly to the plurality of recording and reproducing portions except for the recording and reproducing portion for emergency use and recorded in each before the program starts; and the materials making up the program and transferred from the material server are transferred to the recording and reproducing portion for emergency use and recorded therein after the program starts.

In this case, it becomes possible to output materials that were not transferred from the material server to the material output portion in time before the program starts as materials making up the program by using the recording and reproducing portion for emergency use.

Also, it may be configured in such a manner that, of the plurality of recording and reproducing portions that the material output portion has, for example, a use of the recording and reproducing portion for emergency use is changeable. When configured in this manner, in a case where the existing recording and reproducing portion for transmission use fails to operate properly, the recording and reproducing portion for emergency use can be used instead, so that a transmission operation can be continued. In this case, the failed recording and reproducing portion may be repaired or replaced with new one so as to be used as a recording and reproducing portion for emergency use.

According to an embodiment of the present invention, the material output portion is formed of a plurality of recording and reproducing portions. The material output portion can be therefore formed at a lower cost than in a case where it is formed of a transmission server as in the related art. Also, because materials are transferred commonly to a plurality of recording and reproducing portions and recorded in each, even in a case where one recording and reproducing portion is broken, the same material data is backed up by being recorded in the other recording and reproducing portions. Accordingly, a countermeasure, such as mirroring, becomes unnecessary.

BRIEF DESCRIPTION OF THE DRAWINGS

FIG. 1 is a block diagram showing an example of the configuration of a program production transmission system according to an embodiment of the present invention;

FIG. 2 is a view showing an example of a display of a program table;

FIG. 3 is a view showing an example of a display of a cue sheet;

DESCRIPTION OF THE PREFERRED EMBODIMENT

Figure 4:
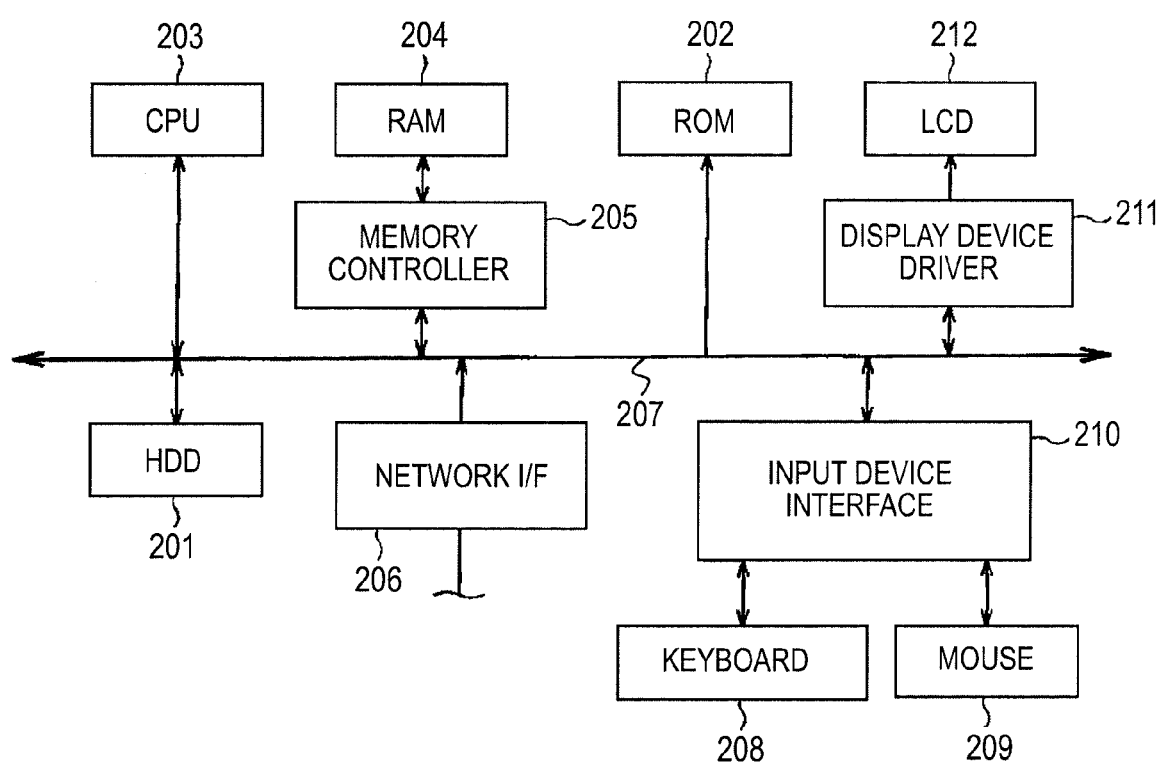
FIG. 4 is a view showing an example of the configuration of an information processing terminal (personal computer) available as respective terminals of a program production support system.

Hereinafter, an embodiment to implement the present invention (hereinafter, referred to as an embodiment of the present invention) will be described in the following order:

1. Embodiment of the present invention
2. Modification.

<1. Embodiment of the Present Invention>
[Example of Configuration of Program Production Transmission System]

FIG. 1 shows an example of the configuration of a program production transmission system 100 according to an embodiment of the present invention. The program production transmission system 100 includes a program production support system 110 and a transmission server system 120.

The program production support system 110 includes a news gathering management terminal 111, a manuscript generation terminal 112, an item input terminal 113, a cue sheet generation terminal 114, and a database 115, all of which are interconnected via a local network and constitute a system. Each terminal is formed of a computer (personal computer or a work station).

The news gathering management terminal 111 is a terminal used to manage news gathering. The manuscript generation terminal 112 is a terminal used by correspondents to write manuscripts. The item input terminal 113 is a terminal used to create a program table and a program item table.

Regarding generation of a program table, a program table is generated by registering a period, a broadcasting frame, and a day of the week when a program is scheduled to be on the air, in a program list. Regarding generation of a program item table, a program item table is generated by adding and changing items on a program item table screen opened by selecting a program on a program table screen. The program table and the program item table generated in the item input terminal 113 are registered in the database 115.

The cue sheet generation terminal 114 is a terminal used to generate a cue sheet (program progress chart). Although FIG. 1 shows only one terminal, there are a plurality of terminals as the cue sheet generation terminal 114. In the cue sheet generation terminal 114, applications of a program and a cue sheet are run.

Figure 3:
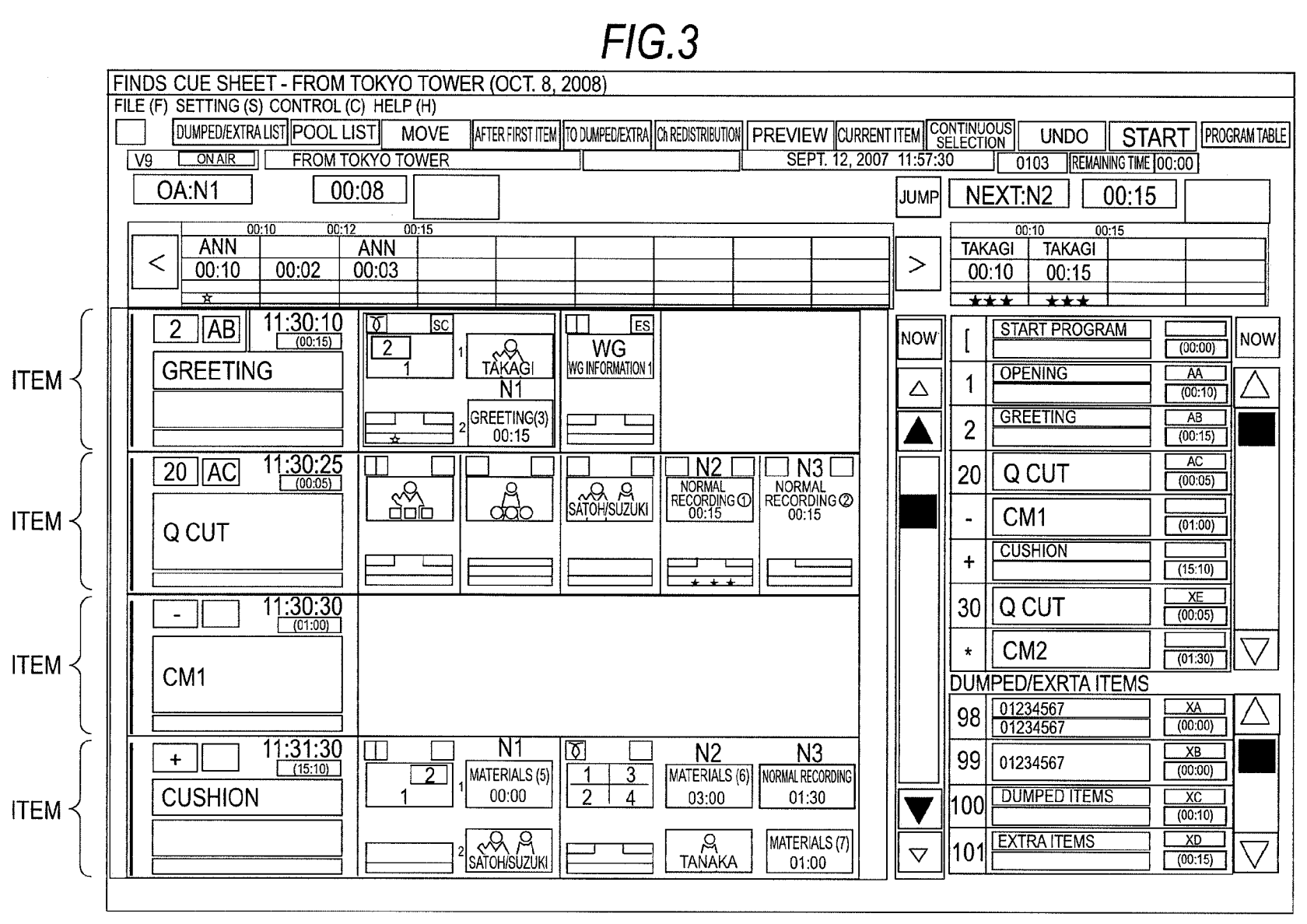

When the application of the program is started, a program table is displayed on the monitor (display panel) of the cue sheet generation terminal 114. FIG. 2 shows an example of the display of the program table. The program table can be changed and corrected while the program table is displayed in this manner. Also, by selecting a specific program from the program table, the application of the cue sheet is started and a cue sheet of the selected program is superimposed on the program table and displayed on the monitor. FIG. 3 shows an example of the display of a cue sheet.

The cue sheet is generated automatically on the database 115 according to information of a program item table of each program generated in the item input terminal 113 described above. Construction information can be added to each item of the cue sheet automatically generated by the cue sheet generation terminal 114. More specifically, while the cue sheet is displayed, the construction information, such as a camera, a VTR, a server, effects, and sounds, is added at the cue sheet generation terminal 114. The cue sheet generated by the cue sheet generation terminal 114 is registered in the database 115.

Although it is not shown in the drawing, besides the terminals described above, the program production support system 110 includes a CG (Computer Graphics) generation terminal used to generate a video by means of CG or a map, a weather map, texts, and so forth displayed while being superimposed on a video and a closed caption terminal used to generate texts for teletext broadcasting.

FIG. 4 shows an example of the configuration of an information processing terminal (personal computer) 200 available as the respective terminals of the program production support system 110.

The information processing terminal 200 has a CPU (Central Processing Unit) 203, a ROM (Read Only Memory) 202, a RAM (Random Access Memory) 204, a memory controller 205, and an HDD (Hard Disk Drive) 201. The information processing terminal 200 also has a network interface 206, a keyboard 208, a mouse 209, an input device interface 210, a display device driver 211, and an LCD (Liquid Crystal Display) 212.

The HDD 201 forms a storage device. The HDD 201 or the ROM 202 stores programs (software) necessary for operations of the respective terminals. For example, in the cue sheet generation terminal 114, the program table (programs) and software of respective applications of the cue sheet described above are stored in the HDD 201 or the ROM 202. The CPU 203 performs processing unique to its own terminal according to the program. The RAM 204 forms a work area of the CPU 203. The memory controller 205 controls writing into and reading from the RAM 204.

The network interface 206 is an interface to establish a connection to an original network or the Internet. Each of the HDD 201, the ROM 202, the CPU 203, the memory controller 205, and the network interface 206 is connected to an internal bus 207.

The keyboard 208 and the mouse 209 form the user interface and accept an editing operation, various setting inputs, and an instruction input from the user, such as a program composer, an editor, and a correspondent. The keyboard 208 and the mouse 209 are connected to the internal bus 207 via the input device interface 210.

The LCD 212 forms a user interface and displays various types of information. For example, the LCD 212 of the cue sheet generation terminal 114 displays the program table and the cue sheet described above. The LCD 212 is connected to the internal bus 207 via the display device driver 211.

Referring to FIG. 1 again, the transmission server system 120 includes a material server 121, a non-linear editing machine 122, a filing terminal 123, an optical disk device interface (IF) terminal 124, and a gateway terminal 125. The transmission server system 120 also includes a machine control terminal 126, a machine control portion 127, optical disk devices 128-1 through 128-3, a linear editing machine 129, and a VTR 130. Herein, the optical disk devices 128-1 through 128-3 together form a material output portion. Also, each of the optical disk devices 128-1 through 128-3 forms a recording and reproducing portion.

In the transmission server system 120 configured as above, the non-linear editing machine 122, the filing terminal 123, the optical disk device IF terminal 124, and the gateway terminal 125 are interconnected via the local network. The transmission server system 120 is connected to the program production support system 110 described above via the gateway terminal 125.

The respective terminals of the program production support system 110 described above are also connected to an unillustrated program transmission system inside the TV station via the network and broadcasting materials outputted from the optical disk devices 128-1 through 128-3 of the video server system 120 are outputted to this program transmission system.

The material server 121 includes a large-capacity recording medium, such as an HDD, and stores broadcasting materials including videos, sounds, computer graphics, and text data. The non-linear editing machine 122 edits the broadcasting materials. A video material obtained through information gathering is directly inputted into the material server 121 from the VTR 130 that has recorded the video material. Alternatively, the video material is inputted after it is edited by the non-linear editing machine 122 or the linear editing machine 129.

The filing terminal 123 instructs the optical disk device IF terminal 124 to transfer materials (broadcasting materials) making up a specific program to the optical disk devices 128-1 and 128-2 for transmission use before the specific program starts. The filing terminal 123 makes this instruction according to the program item table of the specific program registered in the database 115 of the program production support system 110.

The optical disc device IF terminal 124 performs transfer control on the material server 121 and the optical disk devices 128-1 through 128-3 according to an instruction from the filing terminal 123 described above. Consequently, the broadcasting materials are transferred from the material server 121 commonly to the optical disk devices 128-1 and 128-2 for transmission use.

The machine control terminal 126 receives the cue sheet (program progress chart) of the specific program from the database 115 before the specific program starts. When the specific program is started, the machine control terminal 126 generates a control signal according to the cue sheet received from the database 115 as described above and supplies the control signal to the machine control portion 127.

The machine control portion 127 controls reproduction operations of the optical disk devices 128-1 and 128-2 for transmission use according to the control signal supplied therein from the machine control terminal 126. Consequently, materials making up the specific program are reproduced successively by the optical disk devices 128-1 and 128-2 for transmission use and outputted therefrom. The materials reproduced by and outputted from the optical disc devices 128-1 and 128-2 for transmission use in this manner are sent to the program transmission system.

The optical disk devices 128-1 through 128-3 together form the material output portion. The optical disk devices 128-1 and 128-2 are for transmission use as described above and the remaining optical disk device 128-3 is for emergency use. Materials that were not transferred from the material server 121 in time before the program starts are transferred from the material server 121 to the optical disk device 128-3 for emergency use and recorded therein under the control of the filing terminal 123. After the cue is up manually, these materials are reproduced and outputted by operations on the 16-screen touch panel or the like.

[Example of Configuration of Optical Disk Device]

Figure 5:
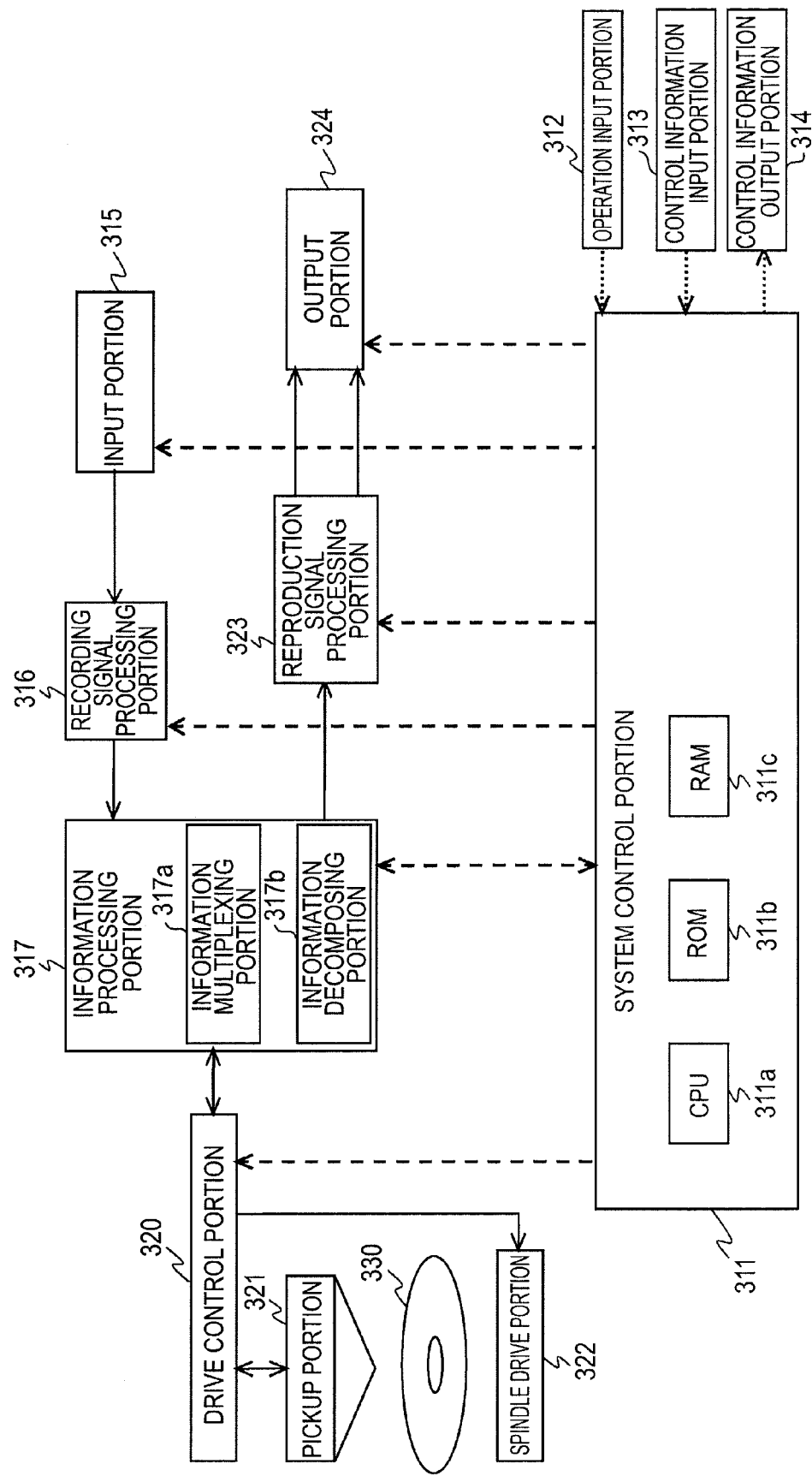
FIG. 5 is a block diagram showing an example of the configuration of an optical disk device.

FIG. 5 shows an example of the configuration of the optical disk device 128 (representing the optical disk devices 128-1 through 128-3). The optical disk device 128 has a system control portion 311, an operation input portion 312, a control information input portion 313, a control information output portion 314, an input portion 315, a recording signal processing portion 316, and an information processing portion 317. The optical disk device 128 also has a drive control portion 320, a pickup portion 321, a spindle drive portion 322, a reproduction signal processing portion 323, and an output portion 324.

As is indicated by broken arrows, the system control portion 311 controls the optical disk device 128 entirely. The system control portion 311 has a CPU (Central Processing Unit) 311a, a ROM (Read Only Memory) 311b, and a RAM (Random Access Memory) 311c.

The CPU 311a functions as a controller that controls operations of the respective portions. The ROM 311b stores a control program to control operations of the CPU 311a and so forth. The RAM 311c functions as a working area of the CPU 311a. The CPU 311a reads out the control program stored in the ROM 311b when the necessity arises and transfers the read control program to the RAM 311c to develop the control program. The CPU 311a controls operations of the respective portions by reading out and running the developed control program.

The operation input portion 312 is formed, for example, of an input device, such as a keyboard and buttons, and accepts an operation input from the user to supply the information thereof to the system control portion 311. The control information input portion 313 accepts information other than the material data from the outside of the optical disk device 128 as control information and supplies the control information to the system control portion 311. The control information output portion 314 outputs the information other than the material data to be supplied to the system control portion 311 to the outside of the optical disk device 128.

The input portion 315 accepts material data (image data, sound data, and so forth) supplied from the outside of the optical disk device 128. The input portion 315 supplies the material data inputted therein to the recording signal processing portion 316. The recording signal processing portion 316 performs processing to convert a transmission format to a recording format by applying signal processing to the material data supplied therein from the input portion 315. The recording signal processing portion 316 supplies the data after the signal processing to the information processing portion 317.

The information processing portion 317 performs processing relating to editing of the material data as the necessity arises under the control of the system control portion 311. For example, the information processing portion 317 has an information multiplexing portion 317a that multiplexes a plurality of pieces of data and an information decomposing portion 317b that decomposes one piece of information into several pieces. The information processing portion 317 therefore performs processing, such as synthesizing and dividing.

The material data as an editing subject is supplied by the recording signal processing portion 316 or the drive control portion 320. Upon acquisition of the material data supplied from the respective portions, the information processing portion 317 edits the material data under the control of the system control portion 311 and supplies the edited material data to the drive control portion 320 or the reproduction signal processing portion 323.

The drive control portion 320 is a processing portion of the optical disk device 128 that controls the respective portions of an unillustrated drive in which an optical disk 330 is loaded. The drive control portion 320 controls the pickup portion 321 and the spindle drive portion 322, for example, under the control of the system control portion 311. The pickup portion 321 performs processing to read out information recorded in the optical disk 330 loaded in the drive and to write information in the optical disk 330. The spindle drive portion 322 controls driving of the optical disk 330 loaded in the drive.

The drive control portion 320 controls the pickup portion 321 and the spindle drive portion 322 so as to supply data read out by the pickup portion 321 to the information processing portion 317. Also, the drive control portion 320 controls the pickup portion 321 and the spindle drive portion 322 so as to write data supplied therein from the information processing portion 317 into the optical disk 330 via the pickup portion 321.

The pickup portion 321 is controlled by the drive control portion 320. The pickup portion 321 irradiates a laser beam to the optical disk 330 loaded in the drive and reads out the data recorded in the optical disk 330 to supply the read data to the drive control portion 320. The pickup portion 321 writes data supplied therein from the drive control portion 320 into the optical disk 330.

In this instance, the pickup portion 321 is controlled by the drive control portion 320 and controls the access position of the optical disc 330 in the radial direction by sliding in the radial direction with respect to the optical disk 330. The spindle drive portion 322 controls the access position of the optical disk 330 in a rotation direction by the pickup portion 321 by controlling chiefly the rotational motion of the optical disk 330 loaded in the drive.

The reproduction signal processing portion 323 performs processing, for example, to convert respective pieces of data from a recording format to a transmission format by applying signal processing to an output signal (or a reproduction signal) supplied therein from the information processing portion 317. The reproduction signal processing portion 323 supplies data after the signal processing to the output portion 324. The output portion 324 outputs the material data (image data, sound data, and so forth) supplied therein from the reproduction signal processing portion 323 to the outside of the optical disk device 128.

Material Transfer from Material Server to Optical Disk Device for Transmission Use and Material Transmission Operation Operations of the transmission server system 120 to transfer materials from the material server 121 to the optical disk devices 128-1 and 128-2 for transmission use and to transmit the materials to the program transmission system will now be described with reference to FIG. 6.

At the time of transfer, a transfer instruction for materials (materials 1) making up a specific program is sent from the filing terminal 123. According to this transfer instruction, the material server 121 and the optical disc devices 128-1 and 128-2 are controlled by the optical disk device IF terminal 124, so that these materials are transferred from the material server 121 commonly to the optical disk devices 128-1 and 128-2 and recorded in each.

In this case, the recording contents of optical disks in the optical disk device 128-1 (transmission 1) and the optical disk device 128-2 (transmission 2) coincide with each other. Also, in this case, because the transfer processing is applied to the optical disk devices 128-1 and 128-2 simultaneously in parallel, the transfer time is equal to a time necessary to transfer materials to a single optical disk device.

Also, at the time of transmission, a reproduction operation of the optical disk devices 128-1 and 128-2 is controlled by the machine control terminal 126 via the machine control portion 127 according to the cue sheet. The reproduction is controlled sequentially in order of "transmission 1" to "transmission 2" and so on from the head of the program, so that the materials are reproduced successively and outputted from the optical disk device as a transmission subject corresponding to the materials.

Although it is not described in the above, for example, when a cue sheet is generated in the cue sheet generation terminal 114 of the program production support system 110, a CH (channel) assignment to determine which materials making up a program are to be outputted from which optical disk device is automatically performed. The CH assignment result is registered in the database 115.

Herein, in a case where the optical disk device as a transmission subject is changed by a NEXT designation while the program is being broadcasted on the air, the materials are reproduced and outputted from the optical disk device as the changed transmission subject. As has been described, the materials are commonly transferred to the optical disk devices 128-1 and 128-2 and recorded in each, so that the recording contents of the disks coincide with each other. Hence, it is possible to address a case where the optical disk device as the transmission subject is changed by a NEXT designation or the like while the program is being broadcasted on the air.

According to an embodiment of the present invention, when the materials making up a specific program are transferred from the material server 121 to the optical disk devices 128-1 and 128-2 to be recorded in each, the program ID is correlated with a disk ID of an optical disk loaded in the disk device at the transfer destination. This correlation is registered in the database 115. Accordingly, while the program is being broadcasted on the air (OA), the correlation between the disk ID of the optical disk loaded in the optical disk device that is to reproduce the materials making up the specific program and the program ID is confirmed.

In short, when this correlation is not registered in the database 115, a warning is notified to an unillustrated cue sheet terminal or an alarm panel. More specifically, in a case where optical disks loaded in the optical disk devices 128-1 and 128-2 are changed after the materials making up the specific program are transferred to the optical disk devices 128-1 and 128-2 from the material server 121, wrong materials will be reproduced while the program is being broadcasted on the air. It is, however, possible to give a warning about such an inconvenience.

Figure 7:
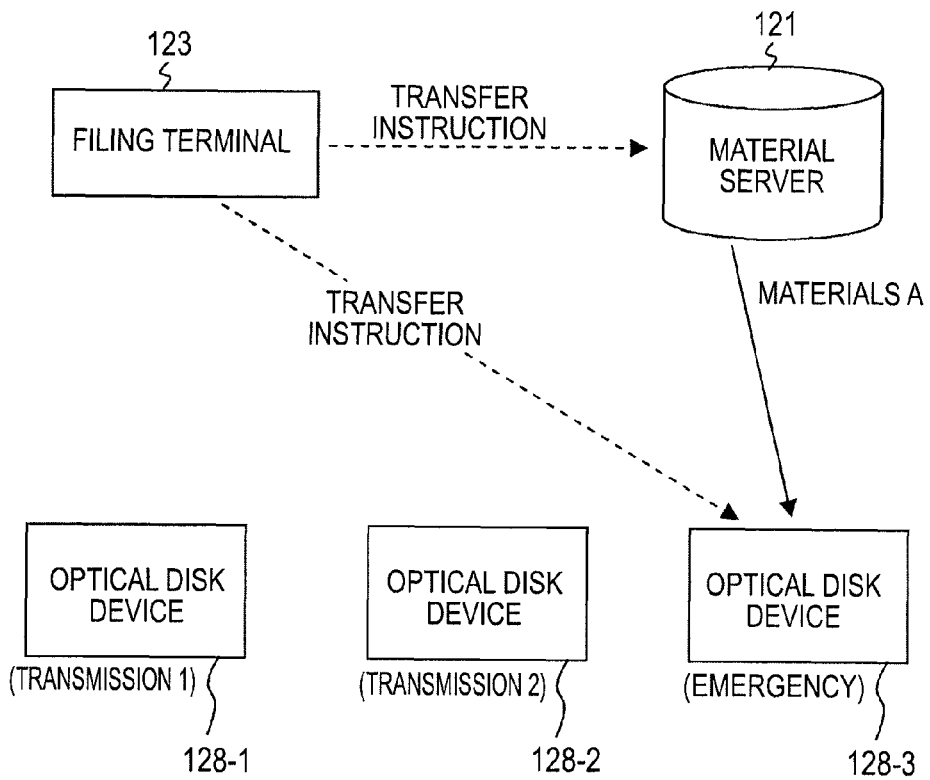
FIG. 7 is a view used to describe operations to transfer materials from the material server to an optical disk device for emergency use and to transmit the materials from this optical disk device.

Material Transfer from Material Server to Optical Disk Device for Emergency Use and Material Transmission Operation Operations of the transmission server system 120 to transfer materials from the material server 121 to the optical disk device 128-3 for emergency use and to transmit the materials to the program transmission system will now be described with reference to FIG. 7.

At the time of transfer, a transfer instruction for materials (materials A) making up a specific program are sent from the filing terminal 123. According to this transfer instruction, the material server 121 and the optical disk device 128-3 are controlled by the optical disk device IF terminal 124, so that the materials are transferred from the material server 121 to the optical disk device 128-3 and recorded therein.

Also, at the time of transmission, after the cue is up manually, the optical disk device 128-3 is controlled by the machine control terminal 126 via the machine control portion 127 according to operations on the 16-screen touch panel or the like. Accordingly, the materials (materials A) are reproduced and outputted.

[Change of Use of Optical Disk Device from Emergency Use to Transmission Use]

A change of use of the optical disc devices 128-1 through 128-3 from emergency use to transmission use and vice versa will now be described. As has been described, the optical disk devices 128-1 and 128-2 are initially assigned for transmission use and the optical disk device 128-3 is assigned for emergency use. According to an embodiment of the present invention, however, it is possible to change a use of the optical disk devices 128-1 through 128-3 from emergency use to transmission use and vice versa.

Figure 8:
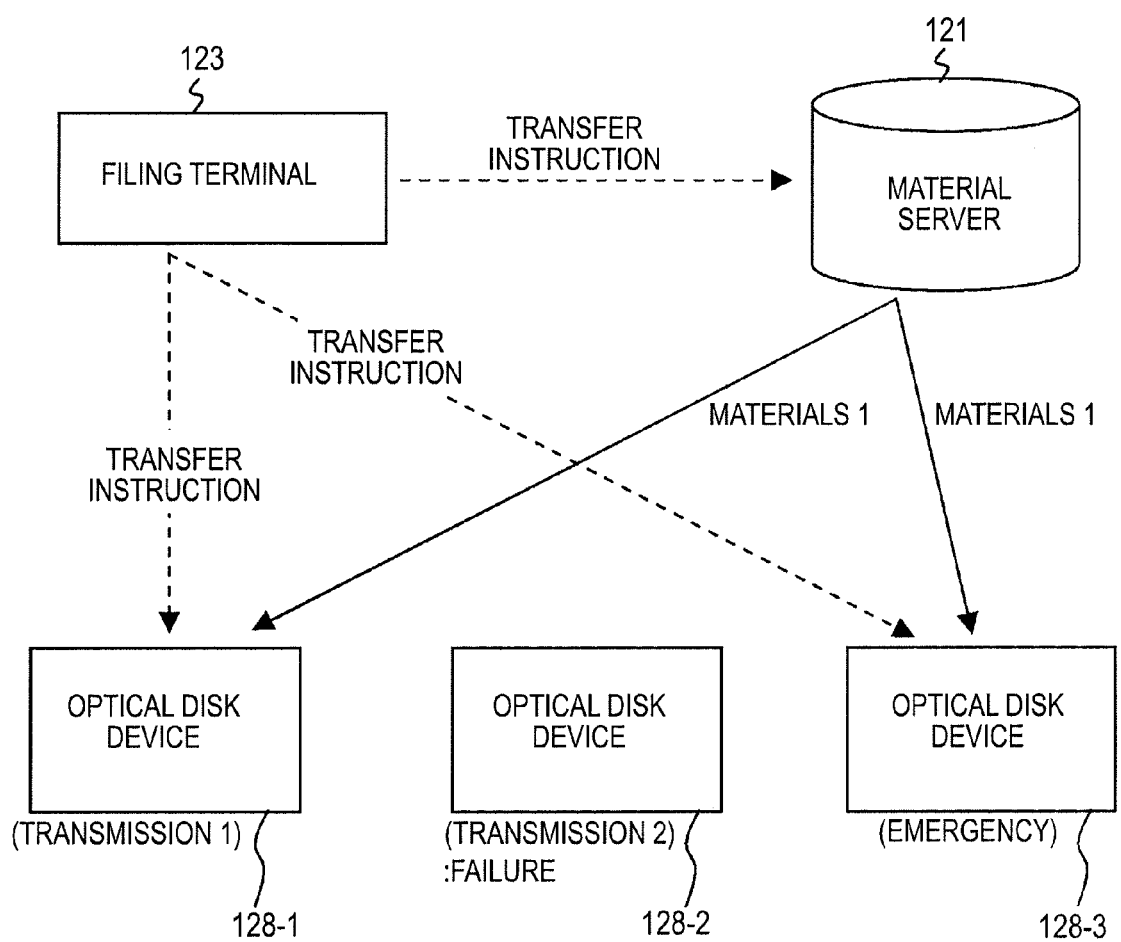
FIG. 8 is a view used to describe a change of use of an optical disk device from an emergency use to a transmission use.

For example, as is shown in FIG. 8, when the optical disk device 128-2 fails to operate properly, it is possible to change a use of the optical disk device 128-3 to "transmission 2" instead of the optical disk device 128-2.

In this case, at the time of transfer, a transfer instruction for materials (materials 1) making up a specific program is sent from the filing terminal 123. According to this transfer instruction, the material server 121 and the optical disk devices 128-1 and 128-3 are controlled by the optical disk device IF terminal 124, so that the materials are transferred from the material server 121 commonly to the optical disk devices 128-1 and 128-3 and recorded in each.

Also, at the time of transmission, a reproduction operation of the optical disk devices 128-1 and 128-3 is controlled by the machine control terminal 126 via the machine control portion 127 according to the cue sheet. The reproduction control is performed in order of "transmission 1", "transmission 2", and so on from the head of the program. The materials are thus successively reproduced by and outputted from an optical disk device as a transmission subject corresponding to these materials.

In this case, the failed optical disk device 128-2 is repaired or replaced with a normal optical disk device to be used as a device for emergency use.

As has been described, in the program production transmission system 100 shown in FIG. 1, the material output portion of the transmission server system 120 is formed of three optical disk devices 128-1 through 128-3. Hence, the material output portion can be formed at a lower cost than in a case where the material output portion is formed of a transmission server as in the related art.

Figure 6:
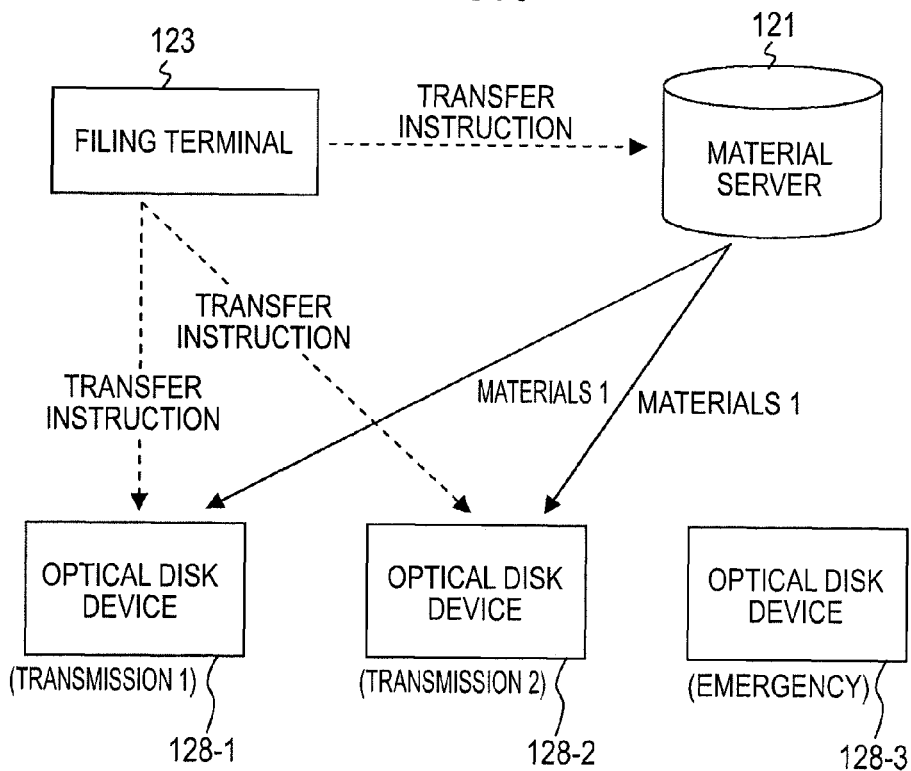
FIG. 6 is a view used to describe operations to transfer materials from a material server to an optical disk device for transmission use and to transmit the materials from this optical disk device.

Also, in the program production transmission system 100 shown in FIG. 1, when materials making up a program are transferred to the material output portion from the material server 121 before the program starts, the materials are transferred commonly to the optical disk devices 128-1 and 128-2 for transmission use (see FIG. 6). The materials are thus transferred commonly to the optical disk devices 128-1 and 128-2 for transmission use and recorded in each. Hence, the recording contents of the disks coincide with each other.

It thus becomes possible to address satisfactorily a case where the optical disk device as a transmission subject is changed by a NEXT designation while the program is being broadcasted on the air. Also, even in a case where one of the optical disk devices 128-1 and 128-2 is broken, because the same materials are recorded in the counterpart device as a backup, a countermeasure, such as mirroring, becomes unnecessary. Also, even in a case where one of the optical disk devices 128-1 and 128-2 is broken, the system can be restored readily at a low cost by replacing the broken device alone.

Also, in the program production transmission system 100 shown in FIG. 1, the material output portion of the transmission server system 120 is formed of three optical disk devices 128-1 through 128-3. The optical disk devices 128-1 and 128-2 are assigned for transmission use whereas the remaining optical disk device 128-3 is assigned for emergency use. Hence, materials that were not transferred from the material server 121 to the material output portion in time before the program starts can be outputted as the materials making up the program by using the optical disk device 128-3 for emergency use (see FIG. 7).

Also, the material output portion of the transmission server system 120 shown in FIG. 1 is formed of three optical disk devices 128-1 through 128-3. Initially, the optical disk devices 128-1 and 128-2 are assigned for transmission use and the remaining optical disk device 128-3 is assigned for emergency use. It is, however, possible to change a use of the optical disk devices 128-1 through 128-3 from emergency use to transmission use and vice versa.

Accordingly, in a case where an optical disk device for transmission use fails to operate properly, it is possible to continue a transmission operation by using an optical disk device for emergency use instead of the failed optical disk device (see FIG. 8). In this case, the failed optical disk device may be repaired or replaced with new one so as to be used as an optical disk device for emergency use.

<2. Modification>

An embodiment of the present invention above has described a case where the material output portion of the transmission server system 120 is formed of three optical disk devices 128-1 through 128-3. It should be appreciated, however, that the material output portion may be formed of two or four or more optical disk devices. Also, an embodiment of the present invention above has described a case where the material output portion of the transmission server system 120 is formed of three optical disk devices 128-1 through 128-3 and one optical disk device 128-3 is assigned for emergency use. It should be appreciated, however, that the number of optical disk devices assigned for emergency use is not limited to one.

Also, an embodiment of the present invention above has described a case where the recording and reproducing portion is an optical disk device (see FIG. 5). It should be appreciated, however, that the recording and reproducing portion of the present invention is not limited to an optical disk device. The recording and reproducing device may be formed of a recording and reproducing device using a recording medium other than an optical disk, such as a magnetic disk, a magnetic tape, and a semiconductor memory.

According to an embodiment of the present invention, it is possible to form the material output portion at a low cost and, moreover, it is possible to make a countermeasure, such as mirroring, unnecessary. An embodiment of the present invention is applicable, for example, to a program production transmission system.

The present application contains subject matter related to that disclosed in Japanese Priority Patent Application JP 2009-065375 filed in the Japan Patent Office on Mar. 18, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A transmission server system comprising:

a material output portion that temporarily stores materials making up a program and transferred from a material server and outputs the materials by successively reading out the materials, wherein the material output portion has a plurality of recording and reproducing portions, the materials making up the program are transferred from the material server commonly to the plurality of recording and reproducing portions and recorded in each, and the respective materials are reproduced by and output from a recording and reproducing portion as a transmission subject among the plurality of recording and reproducing portions, wherein, of the plurality of recording and reproducing portions that the material output portion has, at least one recording and reproducing portion is used as a recording and reproducing portion for emergency use, the materials making up the program and transferred from the material server are transferred commonly to the plurality of recording and reproducing portions except for the recording and reproducing portion for emergency use and recorded in each before the program starts, and the materials making up the program and transferred from the material server are transferred to the recording and reproducing portion for emergency use and recorded therein after the program starts.

2. The transmission server system according to claim 1, wherein, of the plurality of recording and reproducing portions that the material output portion has, a use of the recording and reproducing portion for emergency use is changeable.

3. The transmission server system according to claim 2, wherein each recording and reproducing portion is an optical disk device.

4. A material transferring method comprising the step of:

recording materials making up a program by transferring the materials making up the program from a material server to a material output portion having a plurality of recording and reproducing portions, transferring the materials making up the program from the material server commonly to the plurality of recording and reproducing portions to be recorded in each, using at least one recording and reproducing portion of the plurality of recording and reproducing portions that the material output portion has as a recording and reproducing portion for emergency use, transferring commonly the materials making up the program and transferred from the material server to the plurality of recording and reproducing portions except for the recording and reproducing portion for emergency use and recording in each before the program starts, and transferring the materials making up the program and transferred from the material server to the recording and reproducing portion for emergency use and recording therein after the program starts.

* * * * *